Patented Aug. 30, 1938

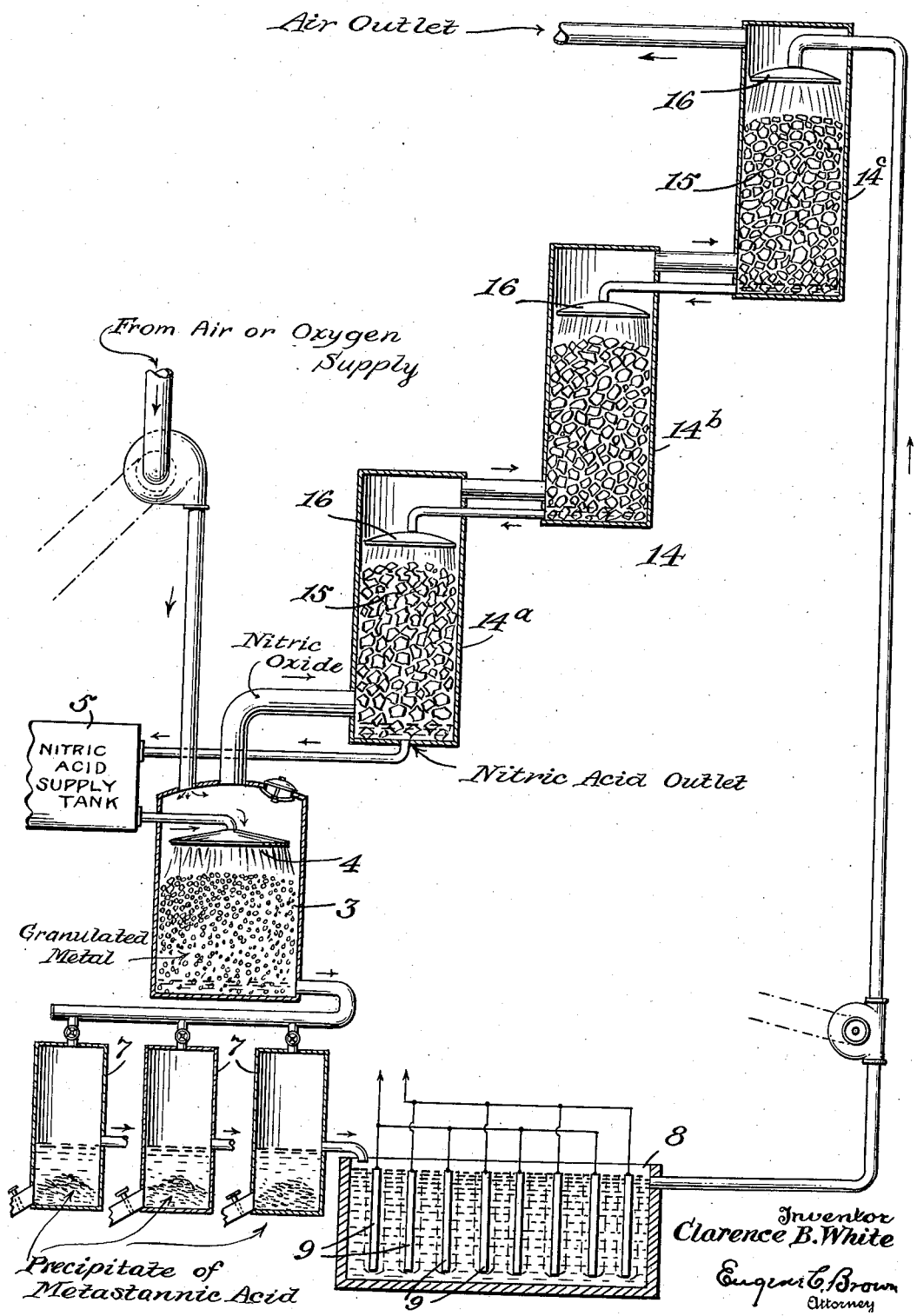

2,128,548

UNITED STATES PATENT OFFICE 2,128,548

PROCESS FOR RECOVERY OF METALS FROM SCRAP AND METALLURGICAL RESIDUES

Clarence B. White, Philadelphia, Pa.

Application July 23, 1937, Serial No. 155,323

1 Claim. (Cl. 204—15)

This invention relates to an economical method of recovering metals such as copper, tin, lead and zinc from scrap material, metallurgical by-products and residues containing metals in the form of alloys.

The primary object of the present invention is to eliminate the partial furnace refining which is usually employed at the present time in metal recovery and to greatly reduce the expense of recovery.

The scrap materials and commercial residues ordinarily contain copper, tin, lead and zinc together with impurities such as nickel, antimony, iron etc. My invention is more specifically directed to the recovery of the metals by leaching and electrolysis. Heretofore the use of nitric acid as the leaching agent or solvent by which to obtain a solution of all of the metals, has not been commercially feasible on account of the great expense of the acid employed. I have devised a process in which the nitric oxide resulting from the reaction of the acid and the metals of the scrap material is recovered to repeatedly replenish the leaching agent in a continuous cycle.

The accompanying drawing is a schematic illustration of apparatus for practicing my process of recovering metals from scrap or metallurgical by-products.

In carrying out my process the granulated material is placed in a leaching tower 3 where it is subjected to a continuous shower or spray 4 of nitric acid from a suitable supply tank 5, together with a suitable supply of oxygen or air. The reactions which take place are as follows:—

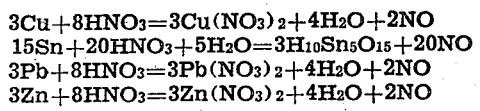

In each case, it will be observed, nitric oxide (NO) is evolved. In order to convert this into nitric acid, the addition of oxygen is necessary. The reaction in oxidizing nitric oxide to form nitric acid is substantially as follows:—

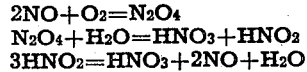

The solution drawn from the bottom of the tower is decanted in the filtering tanks 7, which may be used in succession. The tin is recovered as a precipitate of metastannic acid while the solution is drawn off and electrolyzed by a low voltage current in the electrolytic depositing tank 8.

The electrodes 9 are preferably of insoluble or substantially insoluble material. The copper is deposited on the cathodes as pure electrolytic copper, the lead being deposited on the other electrodes in the form of black oxide of lead. After the removal of the copper and lead, the spent acid from the electrolytic tank is conveyed to the spray head 16 of the uppermost condenser section 14c.

The nitric oxide gas from the leaching tower 3, together with the oxygen from the air or oxygen supply, pass into the lower part of the lowest scrubbing section 14ª of the condenser and percolate upwardly through the mass of broken stone 15 or other suitable rubble, to thereby combine with the spent acid entering through the spray heads 16 and thus replenish the supply of nitric acid.

The recycling of the spent acid in counter-current relationship to the flow of nitric oxide gas constitutes a continuous cyclic renewal of the nitric acid solvent. This is of very great importance and is in fact, a vital controlling factor in the practical recovery of metals from metallurgical by-products by acid solvents on a commercial scale.

I claim:—

A continuous cyclic process for treating scrap metal and metallurgical by-product materals containing tin, copper and lead to recover said metals, which comprises the cyclic use of nitric acid as a solvent, leaching said materials with said solvent with the evolution of nitrous oxide, passing the nitrous gases to an absorbing tower, continuously passing the solution from the leaching tank to an electrolyzing tank, with the provision of a filtering tank between the leaching and electrolyzing tanks to precipitate the tin as metastannic acid, electrolyzing the copper and lead from the solution and continuously passing the spent acid from the electrolyzing tank to the absorbing tower in counter-current relationship to the nitric oxide resulting from the leaching operation to regenerate the nitric acid for use in the leaching operation.

CLARENCE B. WHITE.